United States Patent [19]
Johannsen et al.

[11] Patent Number: 5,736,744
[45] Date of Patent: Apr. 7, 1998

[54] WAVELENGTH SHIFTING FILTER

[75] Inventors: James W. Johannsen, Burbank; Alexander Waluszko, Pasadena; Ronald A. Meyer, San Dimas, all of Calif.

[73] Assignee: UVP, Inc., Upland, Calif.

[21] Appl. No.: 622,209

[22] Filed: Mar. 27, 1996

[51] Int. Cl.$^6$ .................................................. H05B 35/00
[52] U.S. Cl. ................................ 250/505.1; 250/504 R; 362/231
[58] Field of Search .................... 250/505.1, 504 R, 250/493.1, 494.1, 372, 483.1; 362/230, 231

[56] References Cited

U.S. PATENT DOCUMENTS

| | | | |
|---|---|---|---|
| 3,866,049 | 2/1975 | Allington | 250/372 |
| 3,891,849 | 6/1975 | Felice et al. | 250/372 |
| 4,241,258 | 12/1980 | Cholin | 250/372 |
| 5,347,342 | 9/1994 | Ehr | 250/504 R |
| 5,387,801 | 2/1995 | Gonzalez et al. | 250/504 R |

*Primary Examiner*—Kiet T. Nguyen
*Attorney, Agent, or Firm*—Lyon & Lyon LLP

[57] ABSTRACT

A wavelength shifting filter having two sheets of material adjacent and parallel with a spacer therebetween about the periphery of the sheets. The sheets are held in a frame. A phosphor coating is located on the inner side of one of the sheets. A transilluminator is associated with the filter and provides radiation in the UV wavelength. One sheet of the filter transmits the UV wavelength. The other sheet transmits at least a portion of the wavelength that the phosphor coating generates when subjected to the UV radiation of the transilluminator. The visual effect of white light is enhanced by the use of white glass.

9 Claims, 2 Drawing Sheets

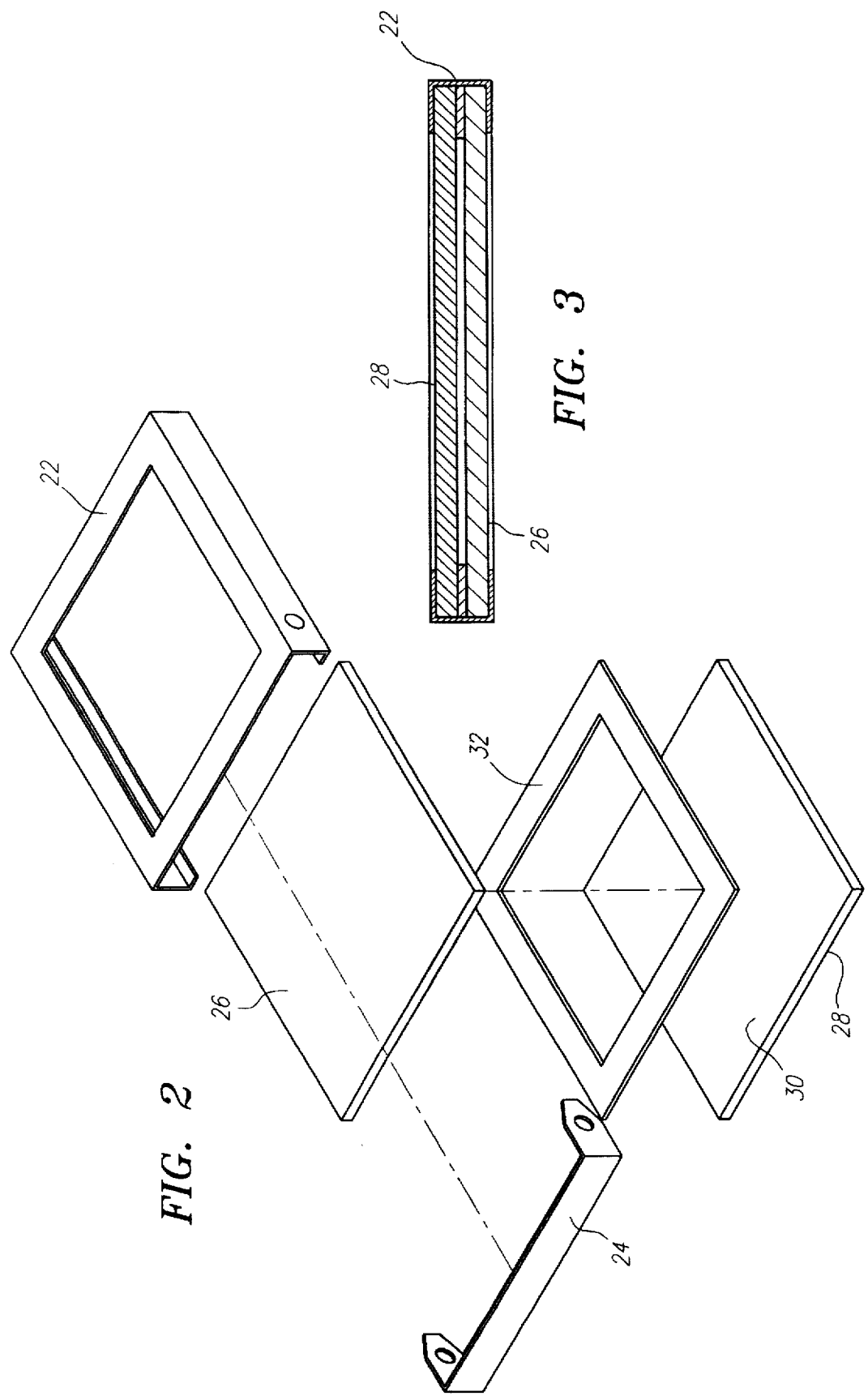

5,736,744

WAVELENGTH SHIFTING FILTER

BACKGROUND OF THE INVENTION

The field of the present invention is transilluminators and associated equipment.

Ultraviolet radiation has been found useful in bioscience labs and particularly DNA research. Light boxes generating ultraviolet A, ultraviolet B and/or ultraviolet C have been developed and are commonly referred to as ultraviolet transilluminators. Such devices irradiate and/or visualize DNA patterns contained in gel matrices. A conventional transilluminator is disclosed in U.S. Pat. No. 4,657,655, incorporated herein by reference.

Ultraviolet radiation is typically generated by a low pressure mercury vapor arc. The wavelength generated is primarily about 254 nm. The ultraviolet energy generated may be converted to other wavelengths through the use of phosphors coating the interior of a tube within which the mercury vapor arc is generated. Such phosphors have the ability to absorb the ultraviolet energy from the arc and reradiate it in other wavelengths. Long wavelength ultraviolet of about 365 nm and mid-range ultraviolet of about 300 nm can be generated by an interior coating of appropriate phosphors on such a tube. Phosphors may also be employed to shift the radiated wavelength to white light or other visible spectral ranges.

A wide variety of wavelengths, both visual and ultraviolet may be used in the laboratory for different backgrounds for viewing, photographing or video imaging electrophoreses gels (DNA), autorads, various staining processes and films, just to mention a few. The objectives are visible at different wavelengths. Typically, multiple transilluminators or replacement tubes for one transilluminator are used to obtain the variety of wavelengths needed in the laboratory. One device having an array of tubes generating three different UVP wavelengths is disclosed in U.S. Pat. No. 5,387,801, incorporated herein by reference. Another device provides lenses on two sides of the transilluminator such that the device can be flipped over to provide a second wavelength in U.S. patent application Ser. No. 08/503,834, filed Jul. 18, 1995, the disclosure of which is incorporated herein by reference.

SUMMARY OF THE INVENTION

The present invention is directed to a wavelength shifting filter separate and apart from a transilluminator. The wavelength shifting filter uses phosphors in a flat array to provide a selection of wavelengths.

In a first, separate aspect of the present invention, two sheets of material are arranged in spaced relationship. One sheet is transparent to UV radiation while the other is transparent to a selected different range of electromagnetic radiation. A phosphor coating is located between sheets which radiates in at least the range selected when radiated with UV radiation.

In a second, separate aspect of the present invention, the foregoing system is associated with a transilluminator. Thus, one transilluminator may be employed to selectively achieve a number of wavelengths through the convenience of a series of wavelength shifting filters. Such filters may also be combined with color filters selectively transmitting a certain range of wavelengths. Included would be white glass which appears to enhance the use of phosphors in generating white light.

Accordingly, it is an object of the present invention to provide a wavelength shifting filter system. Other and further objects and advantages will appear hereinafter.

BRIEF DESCRIPTION OF THE DRAWINGS

FIG. 2 is an exploded perspective view of a wavelength shifting filter.

FIG. 3 is a cross-sectional side view of a wavelength shifting filter.

DETAILED DESCRIPTION OF THE PREFERRED EMBODIMENT

Figure 1:
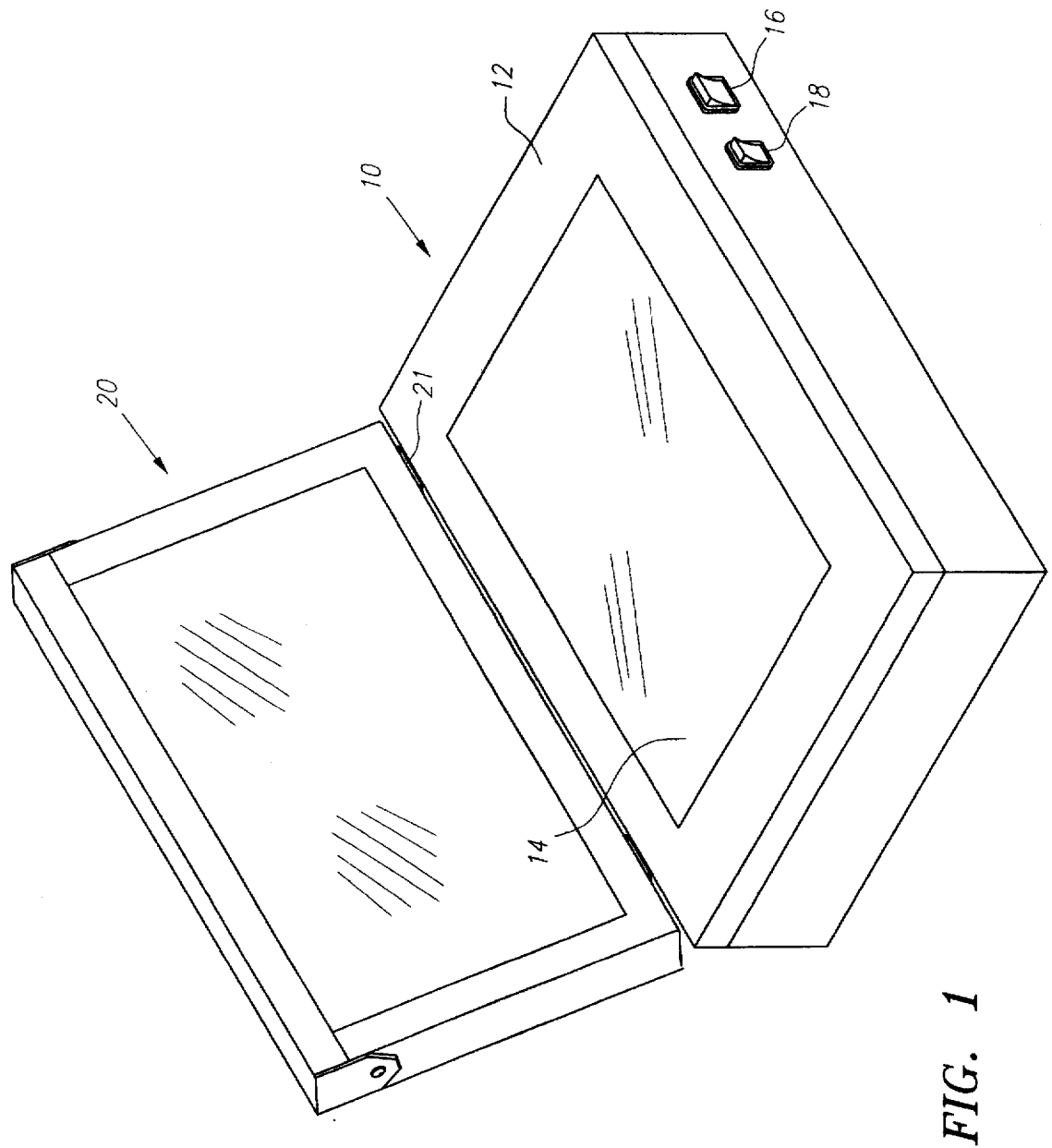
FIG. 1 is a perspective view of a transilluminator with a wavelength shifting filter.

Turning in detail to the drawings, FIG. 1 illustrates a transilluminator, generally designated 10, of conventional design. The transilluminator 10 includes a housing 12, electromagnetic energy radiating tubes (not shown) within the housing 12 and a lens 14. Two switches 16 and 18 are illustrated. One may be for power while the other may be on and off or a selector for tubes generating different wavelengths contained within the same transilluminator. The transilluminator may be selected for the wavelength which it generates. One possible embodiment is to have clear low pressure mercury vapor arc tubes and a lens 14 which is of UVT-acrylic or quartz to transmit short wavelength ultraviolet radiation. Mid and long range UV radiation may be used instead.

Also illustrated in FIG. 1 is a wavelength shifting filter, generally designated 20. The filter 20 may be associated with the transilluminator 10 by hinges 21. The hinges may be of the easily detachable type. Alternatively, simple alignment elements may be used to receive the filter 20 on the transilluminator 10. If hinges 21 are used, the filter 20 may be conveniently shifted from a position over the lens 14 of the transilluminator 10 to a position rotated out of the way.

Looking in detail to the wavelength shifting filter 20, reference is made to FIGS. 2 and 3. The wavelength shifting filter 20 is shown to include a frame 22 having one separable end 24. The separable end 24 may be held to the main frame 22 by fasteners or permanent attachment. The main portion of the frame 22 provides a channel into which the assembly of the wavelength shifting filter components may be placed. The separable end 24 would then be assembled with the frame 22 to retain the components. A first sheet of material 26 is shown to be flat and roughly square. Obviously, different dimensions and some curvature may also be possible. The first sheet of material 26 is preferably transparent to the electromagnetic radiation transmitted by the transilluminator 10. Thus, the lens 26 is most conveniently of the same material or at least the same transmissivity as the lens 14 on the transilluminator 10. UVT-acrylic or quartz is contemplated for the sheet 26.

A second sheet of material is sized and configured to roughly conform to the same pattern as the first sheet of material 26. The two sheets 26 and 28 are intended to be most conveniently arranged in parallel orientation and of coterminous extent. The material of the sheet 28 is selected to be most transparent to the electromagnetic radiation which the filter is to generate. Where that light is in the UV range, UVT-acrylic or quartz is most appropriate. Where light is in the visible range, glass is generally suitable. Where color ranges are desired, glass tinted according to conventional practices may be used. It has been found that when white light is to be generated, white glass enhances the visual effect.

On the inner surface of one of the sheets 26 and 28, a phosphor or phosphors may be applied to form a coating. In the embodiment illustrated, the coating 30 is located on the inner surface of the sheet 28. The coating 30 is to absorb the electromagnetic radiation generated by the tubes of the transilluminator 10 and radiate a desired second wavelength. Thus, short wavelength UV may be converted to longer wavelength UV or visible light. A range of visible light may be selected by using a tint within the second sheet. To protect the phosphor, a spacer 32 is positioned between the sheets 26 and 28. The spacer 32 is provided about the periphery of the filter such that it does not interfere with radiation transmitted through the filter. It is not essential that the spacer 32 be continuous fully about the periphery of the filter. Air does not need to be excluded from the interior of the filter.

Accordingly, an improved system is disclosed which provides a convenient mechanism for readily adapting to different wavelengths. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A wavelength shifting filter for use with UV radiation, comprising a first sheet of material transparent to UV radiation;

a second sheet of material adjacent to the first sheet, the second sheet being white; and a phosphor coating between the first sheet and the second sheet, the second sheet being transparent to a range of electromagnetic radiation, the phosphor coating radiating electromagnetic energy in at least the range to which the second sheet is transparent when the phosphor coating is radiated with the UV radiation.

2. The wavelength shifting filter of claim 1 further comprising a spacer between the first sheet and the second sheet.

3. The wavelength shifting filter of claim 1, the phosphor, coating being on the second sheet.

4. The wavelength shifting filter of claim 1, the second sheet transmitting only one color range of the visible spectrum.

5. The wavelength shifting filter of claim 1, the first sheet and the second sheet being parallel.

6. The wavelength shifting filter of claim 1 further comprising a frame about the first sheet and the second sheet, the frame being opaque to UV radiation.

7. A wavelength shifting filter comprising a transilluminator having UV generating tubes therein and a lens;

a first sheet of material transparent to UV radiation;

a second sheet of material adjacent to the first sheet;

a phosphor coating between the first sheet and the second sheet, the second sheet being white and transparent to a range of electromagnetic radiation, the phosphor coating radiating electromagnetic energy in at least the range to which the second sheet is transparent when radiated by the transilluminator and;

a frame containing the first sheet and the second sheet and being positionable on the transilluminator.

8. The wavelength shifting filter of claim 7 wherein the transilluminator is hinged to the frame such that the frame may be positioned over the lens or rotated from over the lens.

9. The wavelength shifting filter of claim 7, the phosphor coating being on the second sheet.

\* \* \* \* \*